United States Patent [19]

Boutaghou et al.

[11] Patent Number: 5,550,689
[45] Date of Patent: Aug. 27, 1996

[54] MAGNETIC FLUID SEAL AND GROUND PATH FOR LOW PROFILE DISK DRIVES

[75] Inventors: Zine-Eddine Boutaghou; Luke A. Cossette; Richard W. Luoma, all of Rochester, Minn.

[73] Assignee: International Business Machines Corporation, Armonk, N.Y.

[21] Appl. No.: 512,073

[22] Filed: Aug. 7, 1995

Related U.S. Application Data

[63] Continuation of Ser. No. 179,015, Jan. 7, 1994, abandoned.
[51] Int. Cl.$^6$ .......................... G11B 17/028; G11B 33/14
[52] U.S. Cl. ...................... 360/99.08; 360/97.02
[58] Field of Search .................. 360/99.08, 99.04, 360/98.07, 97.02; 369/269; 310/90; 384/133; 277/80

[56] References Cited

U.S. PATENT DOCUMENTS

| | | | |
|---|---|---|---|
| 4,526,379 | 7/1985 | Raj | 277/80 |
| 4,694,213 | 9/1987 | Gowda et al. | 310/90 |
| 4,824,122 | 4/1989 | Raj et al. | 384/133 |
| 5,051,853 | 9/1991 | Hosoya | 360/99.08 |
| 5,061,868 | 10/1991 | Iwazaki et al. | 310/90 |
| 5,165,701 | 11/1992 | Koba | 384/133 |
| 5,238,254 | 8/1993 | Takii et al. | 277/80 |
| 5,323,076 | 6/1994 | Hajee | 310/90 |

FOREIGN PATENT DOCUMENTS

| | | |
|---|---|---|
| 0364604 | 4/1990 | European Pat. Off. . |
| 60-029993 | 2/1985 | Japan ................ 360/98.07 |
| 2173049 | 10/1986 | United Kingdom . |

*Primary Examiner*—Robert S. Tupper
*Assistant Examiner*—Craig A. Renner
*Attorney, Agent, or Firm*—Robert W. Lahtinen; Shawn B. Dempster; Karuna Ojanen

[57] ABSTRACT

A magnetic fluid seal is provided by mounting an annular, axially polarized magnet mounted on the device base member and an annular ring pole piece with an inner diameter that cooperates with an outer diameter surface of the hub assembly to form a fluid gap that is radially outward and within the axial extent of the spindle bearings. The secondary gap of the seal assembly is within the bearing assembly sealed volume while the principal sealing gap is within the hub assembly to confine any debris or aerosols resulting from high rotational velocity or shock to be contained in proximity to the flux fields that can recapture any magnetic material. The assembly also inherently presents an effective conductive path to provide enhanced grounding of the rotating assembly through the magnetic fluid in the second gap which is not subject to impairment caused by bonding materials. The seal assembly design also provides for self loading of the magnetic fluid without permitting escape of smeared liquid beyond the region of the seal assembly.

12 Claims, 6 Drawing Sheets

MAGNETIC FLUID SEAL AND GROUND PATH FOR LOW PROFILE DISK DRIVES

This application is a continuation of application Ser. No. 08/179,015, filed Jan. 7, 1994, now abandoned.

FIELD OF THE INVENTION

This invention pertains to disk drives and more particularly to magnetic fluid seals for low profile disk drives.

BACKGROUND OF THE INVENTION

In addition to the problems confronting the designer of any magnetic disk storage device to overcome contamination by particulates and outgassing of the component materials, the new miniaturized form factors pose the problems of providing a solution for each design requirement in a severely confined space environment. The Personal Computer Memory Card Industry Association (PCMCIA) Type II drive standard specifies an overall device height of only 5 mm and length and width dimensions of approximately 3¼ and 2 inches respectively. The spindle design with conventional bearing and motor technologies require extensive miniaturization of all components. The existing magnetic fluid seals have a thickness of 0.75 mm and cannot be readily used in PCMCIA Type II applications.

SUMMARY OF THE INVENTION

The spindle assembly of the present invention uses a magnetic fluid seal including an axially polarized, annular permanent magnet mounted on a magnetically permeable base and an annular pole piece which cooperates with the spindle hub to provide a gap for magnetic fluid which forms a seal. The seal is radially outward from the spindle bearing assembly and within the axial extent of the bearing assembly to overcome the limited axial space provision of the spindle design specification. Further, with the magnetic fluid confined within the hub assembly, any high shock levels that may be encountered will cause any fluid displacement to be contained in a manner that will not contaminate the disk enclosure. Also, the design provides for grounding of the rotating hub more effectively than conventional designs. These enhanced capabilities are in addition to the use of the seal to stop air flow through the spindle assembly, insuring that spindle and bearing debris and aerosols do not enter the disk enclosure.

DETAILED DESCRIPTION

Figure 1:
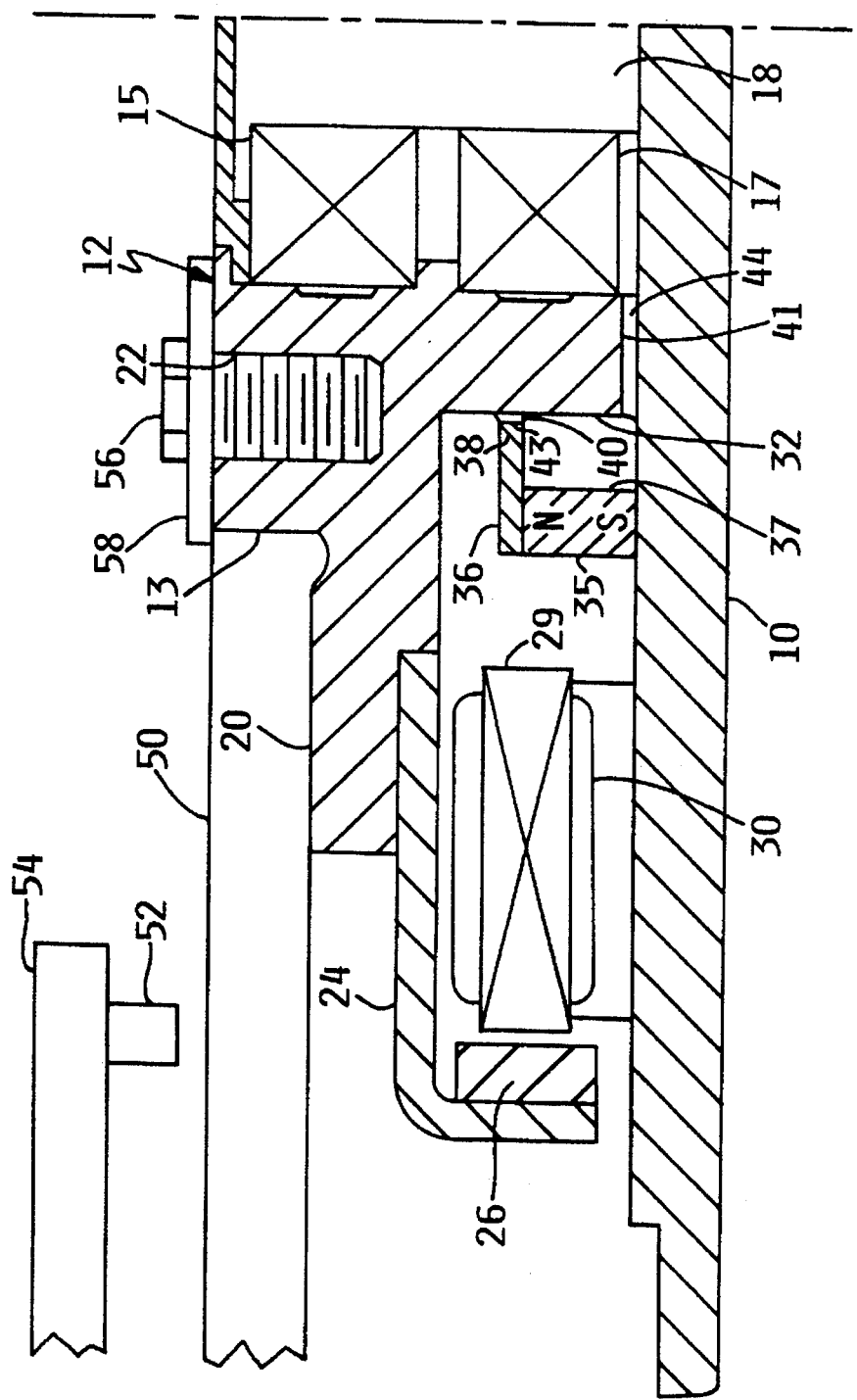
FIG. 1 is a half section of a disk drive base and spindle assembly showing the magnetic fluid seal of the present invention.

Referring to FIG. 1, portions of a disk drive are shown including the base member 10 and the hub assembly 12 of a low profile disk drive. The base 10 is formed of magnetically permeable steel. The low carbon steel hub 13 is mounted on bearings 15, 17 to facilitate rotation about a shaft 18 that is fixed to base 10. The disk 50 is supported on the radial hub surface 20 and may be clamped by a plate 58 which is fastened by a series of bolts 56 which are received in threaded hub openings 22. In addition, a transducer 52 supported to read data from a surface of the idsk 50 by an actuator 54 such that the transducer 52 moves over the surface of the disk 50. The motor rotor is fixed to hub 13. A bell shaped rotor 24 is mounted as a unitary part of hub assembly 12 and surrounds a ring-shaped rotor magnet 26. The stator laminations 29 and windings 30 are fixed to and supported by base 10.

Radially between the hub and spindle motor, the magnetic fluid seal assembly is mounted on base 10 and cooperates with the hub cylindrical surface 32. A cylindrical magnet 35, that is axially polarized, is mounted on base 10 with a cylindrical pole piece 36 that extends from the magnet distal cylindrical end to present a cylindrical surface 38 at the inner diameter to form a radial gap of approximately 0.1 mm where the highest density of magnetic flux causes the magnetic fluid 40 to be concentrated, forming the seal.

At high rotational disk speeds and in the event that high shock levels are encountered, traditional magnetic fluid seals may tend to splash and cause contamination of the disk enclosure. The design as shown contains the magnetic fluid within the spindle assembly, thus in the event of high shock levels, the fluid displaced from the seal at the gap migrates back to the pole/hub gap 43 or to the hub/base gap 44. The fluid that migrates to the hub/base gap 44 is within the sealed volume of the bearing assembly and does not constitute a contamination exposure. The pole hub gap 43 acts as a barrier for fluid migration since the magnetic field has its maximum concentration and strength in the gap which contributes to the containment of the fluid.

Figure 2:
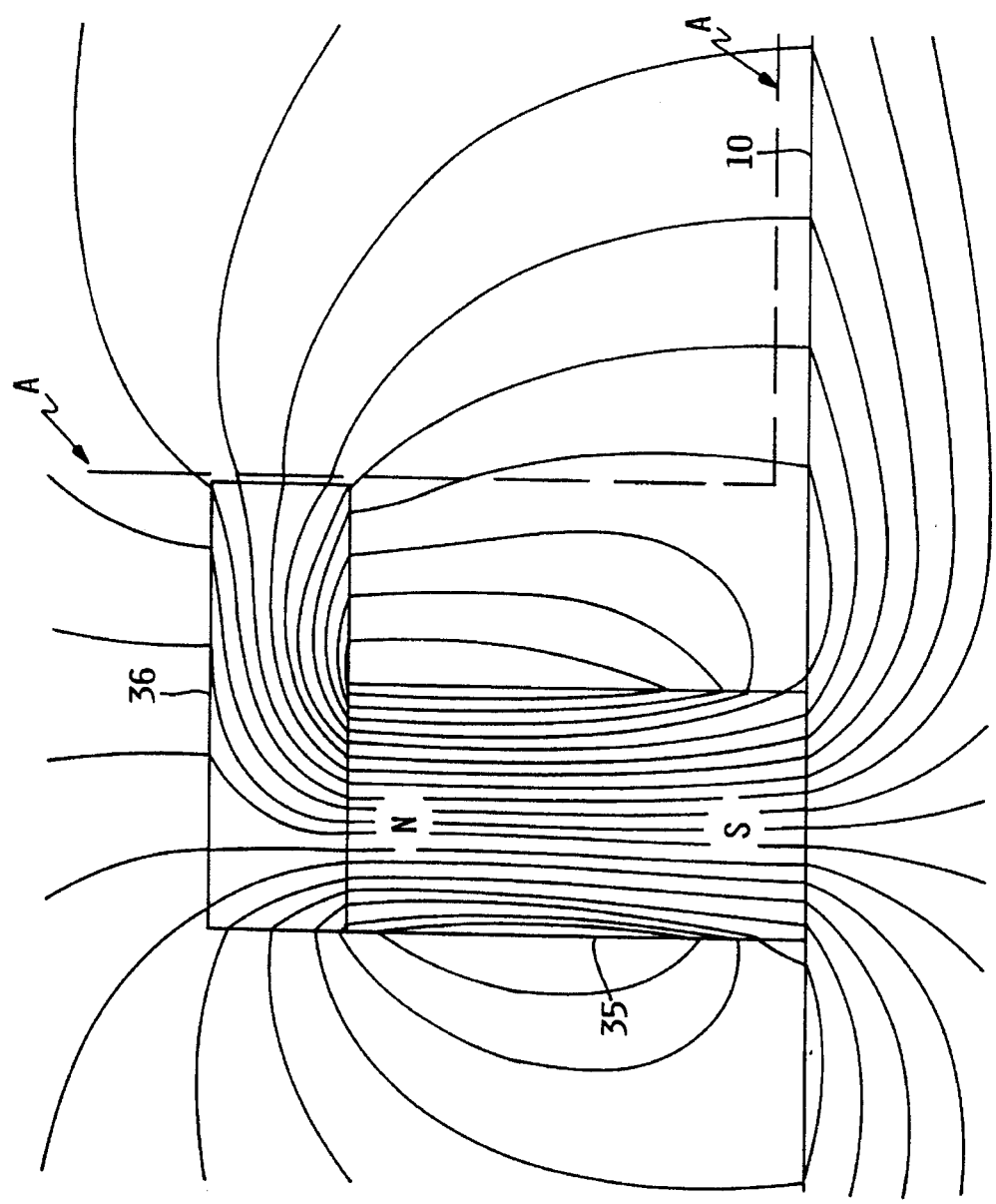
FIG. 2 is a section of the seal assembly magnet, pole piece and base showing flux paths of the seal assembly in the absence of the hub.
Figure 3:
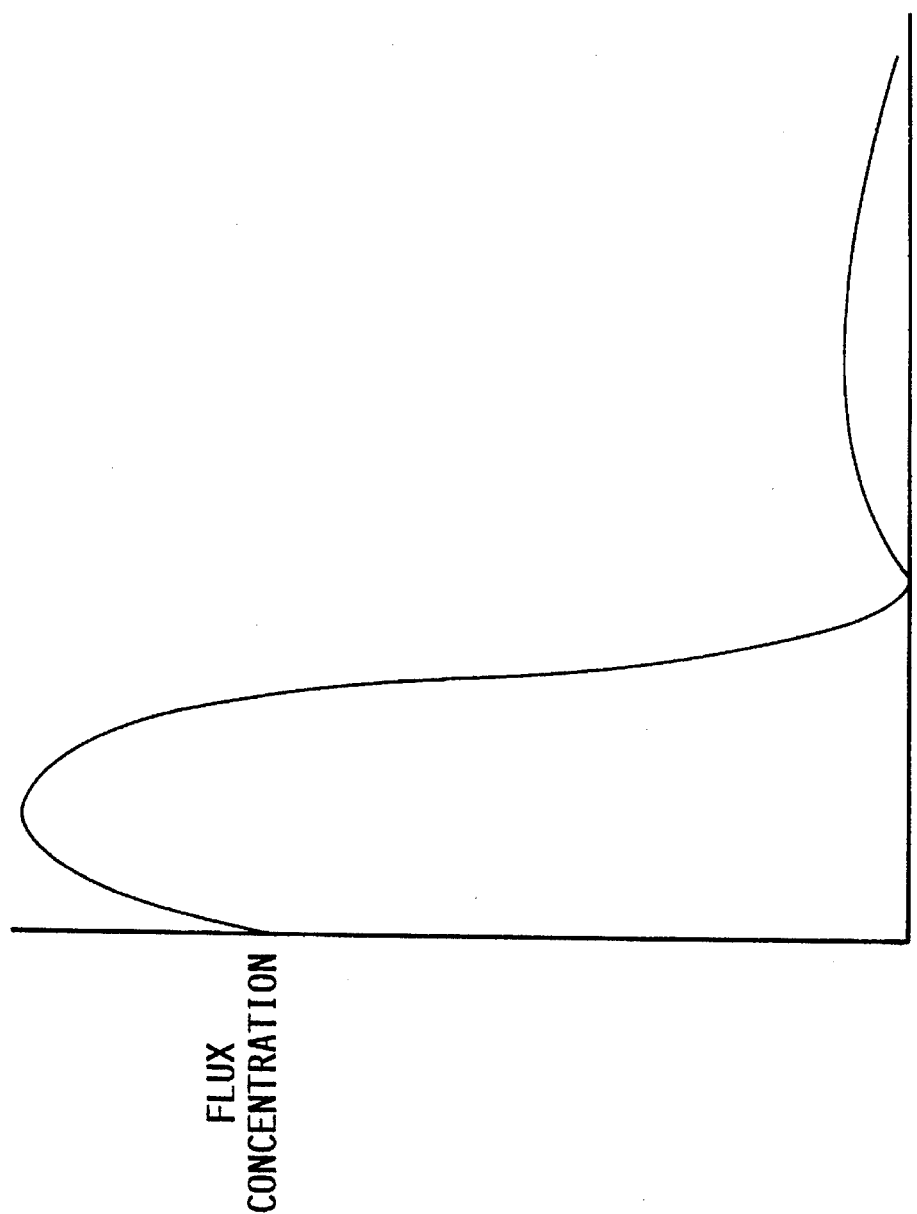
FIG. 3 is a graph showing the flux density along line A of FIG. 2.
Figure 4:
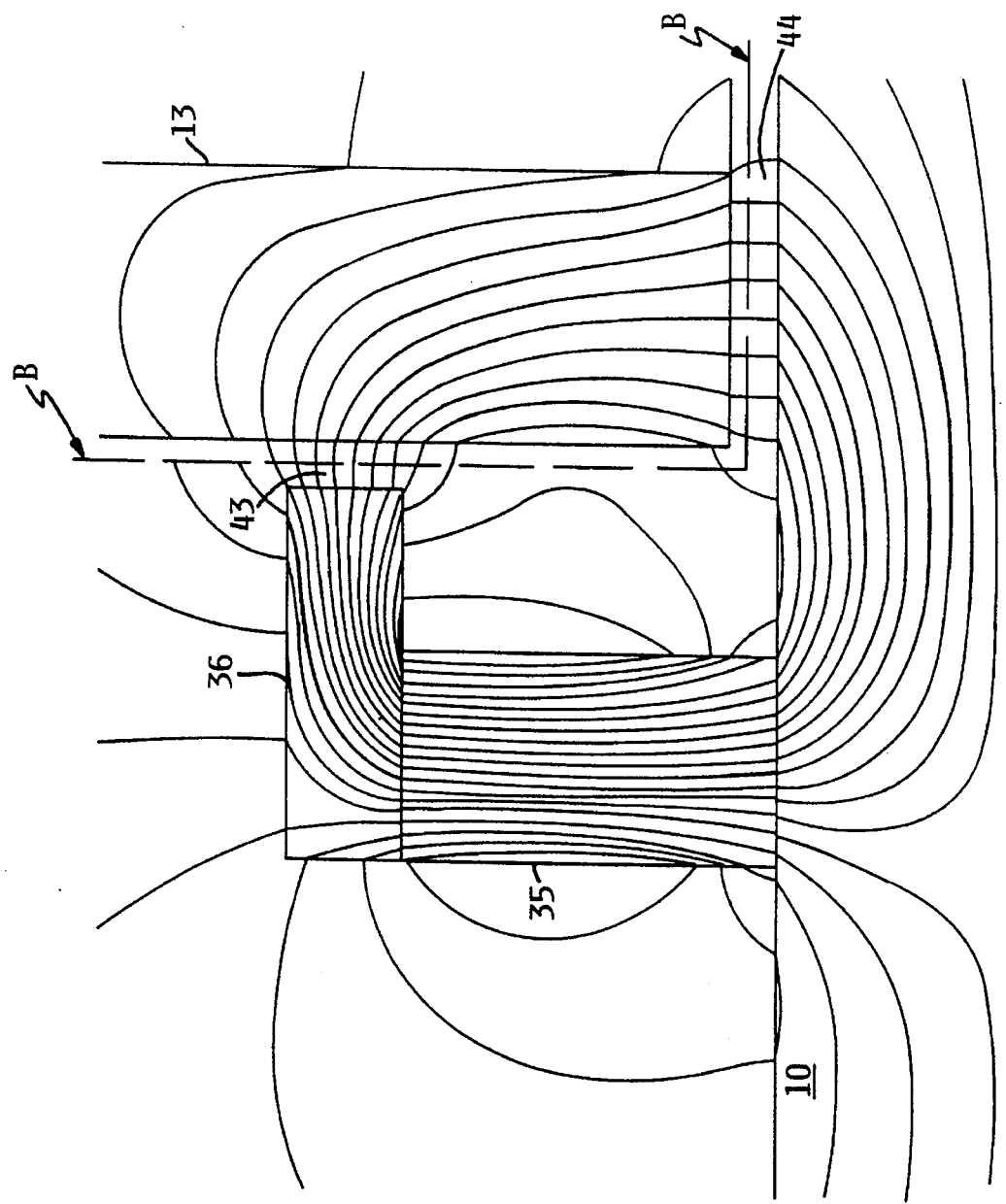
FIG. 4 is similar to FIG. 2 showing flux paths with the hub assembled.
Figure 5:
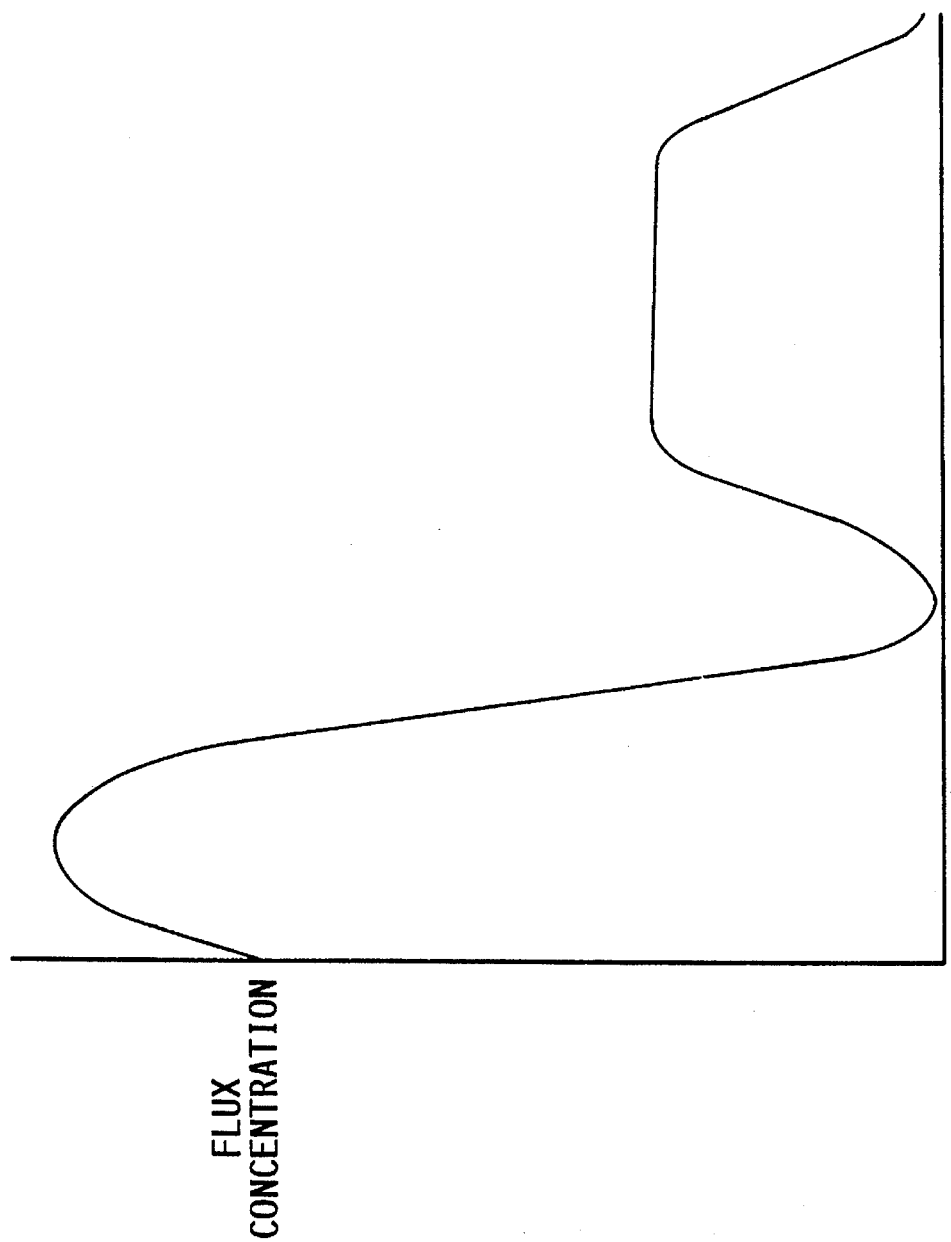
FIG. 5 is a graph showing the flux density along line B of FIG. 4.

FIG. 2 is a section view of the magnet 35, pole piece 36 and a portion of the base 10, without the hub present, showing the flux paths within and proximate to the magnetic fluid seal assembly. FIG. 3 illustrates graphically the flux concentration along the line A of FIG. 2 with the maximum flux density near the annular pole. FIG. 4 is similar to FIG. 2, but with the hub 13 in place in the assembly to provide the return flux path through magnetically permeable material across the primary gap 43 (pole piece/hub) and the secondary gap 44 (hub/base). FIG. 5 graphically shows the magnetic flux concentration along line B of FIG. 4. As in FIG. 3 the maximum concentration is found in the pole piece/hub gap 43, but with the hub present a significant secondary flux concentration occurs near and in the secondary gap 44 between the hub 13 and base 10.

The magnetic seal is charged during the assembly of the drive by applying the magnetic fluid at the inner surface 37 of the magnet 35. As the hub 13 is assembled about shaft 18, the shortest gap which exits between pole piece 36 and hub surface 32 is first established and thereafter the longer base/hub gap between base 10 and hub surface 41. The prior art includes self charging magnetic fluid seal designs. The seal structure is typically an annular assembly with a ring shaped magnet having washer shaped pole pieces at each axial end that each extend radially inward from the magnet. By charging the seal assembly with magnetic fluid at the radially inward magnet surface between the pole pieces, the fluid is retained until assembly around a shaft. However, when the device is assembled axially about the shaft, the magnetic fluid migrates to the gap immediately and some smears along the shaft. This smearing causes some of the liquid to escape the seal assembly and become a contaminant that the seal was used in the device design to preclude.

In the seal design of the present invention, with a primary sealing gap 43 between pole piece and hub and a secondary gap 44 between hub and base, when the hub is assembled to the base, the magnetic fluid that migrates to and smears on the hub during hub to base assembly is captured within the seal assembly between the primary and secondary gaps. Thereby, the sealing integrity of the seal assembly is maintained without introducing contaminants into the device enclosure.

One purpose of a magnetic fluid seal is to provide grounding between the rotating assembly and the base member. For this purpose, electrically conductive magnetic fluids are used. The traditional magnetic fluid seal assembly is bonded to the hub with the result that grounding effectiveness depends upon the conductivity of the adhesive used. Some grounding of the rotating hub assembly is provided through the pole piece 36 and magnet 35 to the base member 10. The effectiveness of this path is dependent on the continuity of the conductive path through the bonding material connecting magnet 35 to base 10 and pole piece 36 to magnet 35. The secondary gap 44 affords a grounding path between hub 13 and base 10 through the magnetic fluid which is not compromised by any bonding materials. This secondary gap is formed by the base and hub that present extensive confronting surface areas. A direct path to ground is more vital in the increasingly common environments wherein the rotating spindle assembly is supported on a fluid bearing that does not provide the grounding that occurs with ball bearing assemblies.

Figure 6:
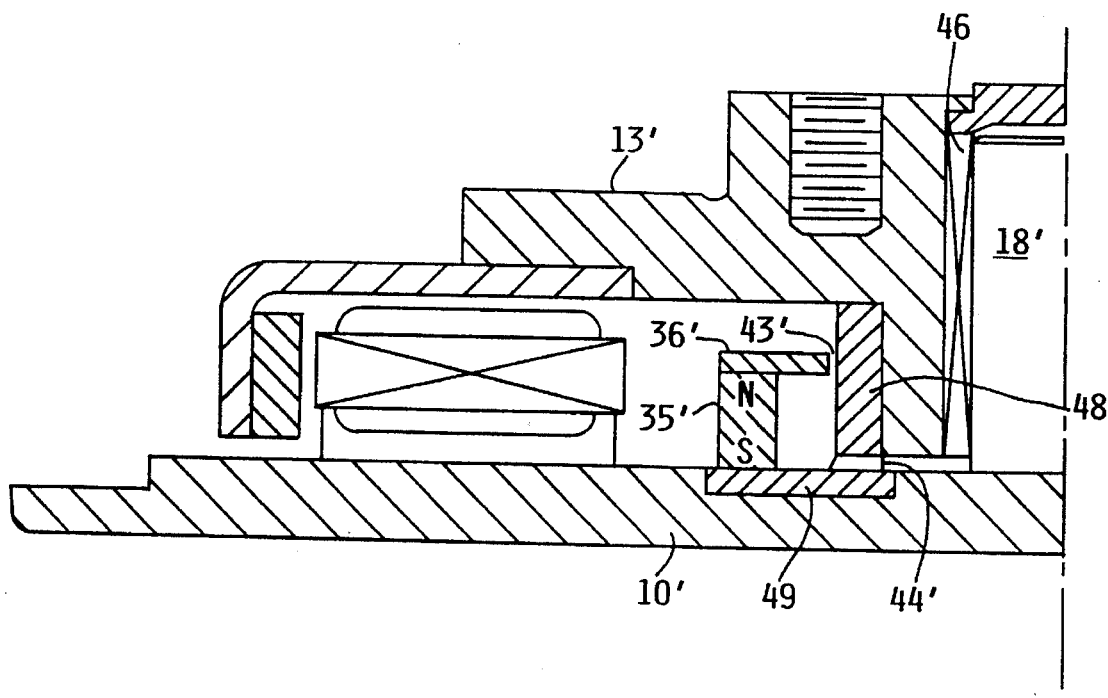
FIG. 6 is a half section similar to FIG. 1 illustrating a second embodiment of the invention.

FIG. 6 is similar to FIG. 1 and shows a second embodiment of the invention. A base 10' supports a shaft 18' about which a hub 13' rotates, supported on a bearing assembly 46 which may be either a fluid bearing or a ball bearing assembly. In this embodiment, both hub 13' and base 10' are formed of nonmagnetic material. The magnet 35' and pole piece 36' create a primary gap 43'. The magnetic flux circuit is completed by a cylindrical sleeve 48 of magnetically permeable material that is secured to rotate in unison with hub 13' and an insert ring 49 of magnetically permeable material fixed in the base, as for example, by pressing or by casting. Sleeve 48 and insert 49 confront one another to create the secondary gap 44'.

While the invention has been particularly shown and described with reference to preferred embodiments, it will be understood by those skilled in the art that various changes in form and details may be made therein without departing from the spirit and scope of the invention.

What is claimed is:

1. A data storage disk drive comprising:

a rigid base member;

a spindle shaft supported on said base member;

a hub mounted about an axis of said spindle shaft and supported on a bearing assembly;

at least one disk mounted on said hub;

a spindle motor to drive said hub to rotation;

at least one transducer supported to read data from a surface of said at least one disk;

actuator means supporting said at least one transducer for movement over said surface of said at least one disk;

an annular permanent magnet supported on said base member;

an annular pole piece contacting said annular permanent magnet and presenting a cylindrical surface confronting a cylindrical surface of said hub with a gap therebetween, said gap being located radially outward from said cylindrical surface of said hub and said bearing assembly and radially inward from said spindle motor, said gap being axially aligned with said bearing assembly; and magnetic fluid retained in said gap.

2. The data storage disk drive of claim 1 wherein said annular pole piece presents an inner diameter cylindrical surface that confronts an outer diameter hub surface.

3. The data storage disk drive of claim 2 wherein said magnetic fluid is an electrically conductive magnetic fluid and the data storage disk drive further comprises a second gap between said base member and said hub with said electrically conductive magnetic fluid therein and wherein said base member and said hub are formed of magnetically permeable material and said electrically conductive magnetic fluid in said second gap provides a grounding path between said hub and said base member.

4. The data storage disk drive of claim 2 wherein said hub and said base member are formed of magnetically permeable material and each forms a part of the path for the flux of the annular permanent magnet.

5. The data storage disk drive of claim 2 wherein said base member and said hub are formed of nonmagnetic material and the data storage disk drive further comprises a sleeve element of magnetically permeable material secured to said hub with a cylindrical surface confronting said pole piece to form said gap; an insert of magnetically permeable material in said base member upon which said permanent magnet is supported and a second gap between said sleeve element and said insert.

6. The data storage disk drive of claim 4 wherein the spindle motor comprises a rotor formed integral with said hub and a stator horizontally mounted on said base member such that a major axis of stator laminations of said stator extends substantially perpendicular to the axis of said spindle shaft and wherein said spindle motor is located radially outward from said annular permanent magnet.

7. The data storage disk drive of claim 6 wherein said magnetic fluid is an electrically conductive magnetic fluid and said annular permanent magnet, said annular pole piece and said magnetic fluid in said gap form a grounding path between said hub and said base member.

8. A rigid disk data storage device comprising:

a rigid base member;

a disk carrying hub mounted on a bearing assembly for rotation about a central axis and supported on said base member;

a spindle motor to drive said hub to rotation;

a magnetic fluid seal assembly supported on said base member and presenting an annular flux gap which confronts an outer diameter surface of said hub, said gap being located radially outward from said outer diameter surface of said hub and said bearing assembly and radially inward from said spindle motor, said gap being located within the axial extent of said bearing assembly; and magnetic fluid retained in said gap.

9. The rigid disk data storage device of claim 8 wherein the spindle motor comprises a rotor portion mounted for rotation in unison with said hub and a stator portion horizontally mounted on said base member such that a major axis of stator laminations of said stator portion extends substantially perpendicular to the central axis and wherein said magnetic fluid seal assembly flux gap is radially intermediate said hub and said spindle motor.

10. The rigid disk data storage device of claim 9 wherein said magnetic fluid seal assembly comprises an annular, axially polarized magnet mounted on said base member and an annular pole piece at the distal axial end of said annular, axially polarized magnet that presents an inner diameter which forms a principal fluid gap in cooperation with an outer diameter surface of said hub.

11. The rigid disk data storage device of claim 10 wherein said magnetic fluid is an electrically conductive magnetic fluid and the rigid disk data storage device further comprises a second gap between said base member and said hub with said electrically conductive magnetic fluid therein and wherein said base member and said hub are formed of magnetically permeable material and said electrically conductive magnetic fluid in said second gap provides a grounding path between said hub and said base member.

12. The rigid disk data storage device of claim 11 wherein said hub presents a radial surface which confronts said base member to form said second gap.

* * * * *